United States Patent
Cheng et al.

(10) Patent No.: US 11,012,229 B2
(45) Date of Patent: May 18, 2021

(54) METHOD FOR PREVENTING SHORT-TERM BIFURCATION AND DOUBLE-SPEND ATTACK ON BLOCK CHAIN NETWORK

(71) Applicant: WEALEDGER NETWORK TECHNOLOGIES CO., LTD., Shenzhen (CN)

(72) Inventors: Wenbin Cheng, Shenzhen (CN); Guangwu Guo, Shenzhen (CN); Kun Xiao, Shenzhen (CN)

( * ) Notice: Subject to any disclaimer, the term of this patent is extended or adjusted under 35 U.S.C. 154(b) by 0 days.

(21) Appl. No.: 17/251,799

(22) PCT Filed: Mar. 13, 2019

(86) PCT No.: PCT/CN2019/077932
§ 371 (c)(1),
(2) Date: Dec. 12, 2020

(87) PCT Pub. No.: WO2019/242340
PCT Pub. Date: Dec. 26, 2019

(65) Prior Publication Data
US 2021/0119778 A1    Apr. 22, 2021

(30) Foreign Application Priority Data
Jun. 22, 2018   (CN) .......................... 201810652782.5

(51) Int. Cl.
*H04L 9/06* (2006.01)
*H04L 9/30* (2006.01)
*H04L 9/32* (2006.01)

(52) U.S. Cl.
CPC .............. *H04L 9/0643* (2013.01); *H04L 9/30* (2013.01); *H04L 9/3247* (2013.01); *H04L 2209/38* (2013.01)

(58) Field of Classification Search
CPC ....... H04L 9/0643; H04L 9/3247; H04L 9/30; H04L 2209/38
USPC ......................................................... 713/189
See application file for complete search history.

(56) References Cited

U.S. PATENT DOCUMENTS

| | | | | |
|---|---|---|---|---|
| 9,875,510 | B1* | 1/2018 | Kasper | H04L 67/104 |
| 10,790,963 | B2* | 9/2020 | Watanabe | H04L 9/0637 |
| 2014/0310243 | A1* | 10/2014 | McGee | G06F 16/27 |
| | | | | 707/639 |
| 2017/0034197 | A1* | 2/2017 | Daniel | H04L 9/3236 |
| 2017/0323392 | A1* | 11/2017 | Kasper | H04L 63/123 |
| 2018/0039667 | A1* | 2/2018 | Pierce | G06Q 40/04 |
| 2018/0076957 | A1* | 3/2018 | Watanabe | G06Q 20/3829 |
| 2018/0089683 | A1* | 3/2018 | Setty | G06Q 20/065 |
| 2018/0091524 | A1* | 3/2018 | Setty | H04L 9/0643 |
| 2018/0096347 | A1* | 4/2018 | Goeringer | H04L 9/3247 |
| 2018/0114218 | A1* | 4/2018 | Konik | G06Q 40/08 |
| 2018/0139278 | A1* | 5/2018 | Bathen | H04L 9/3236 |
| 2018/0158034 | A1* | 6/2018 | Hunt | G06Q 20/027 |
| 2019/0149600 | A1* | 5/2019 | Duan | G06F 21/64 |
| | | | | 380/28 |
| 2019/0268138 | A1* | 8/2019 | Mankovskii | G06F 21/64 |
| 2019/0306190 | A1* | 10/2019 | Suraparaju | G06Q 20/0655 |
| 2019/0378140 | A1* | 12/2019 | Sarkissian | G06Q 20/065 |
| 2019/0379543 | A1* | 12/2019 | Sethi | H04L 9/3236 |
| 2020/0134586 | A1* | 4/2020 | Wu | G06Q 20/105 |

FOREIGN PATENT DOCUMENTS

| | | | |
|---|---|---|---|
| CN | 106385315 A | * | 2/2017 |
| CN | 106385315 A | | 2/2017 |
| CN | 107507006 A | | 12/2017 |
| CN | 109033832 A | | 12/2018 |

OTHER PUBLICATIONS

International Search Report of PCT/CN2019/077932 dated Jun. 11, 2019.
Written Opinion of PCT/CN2019/077932 dated Jun. 11, 2019.

* cited by examiner

*Primary Examiner* — Badri Narayanan Champakesan
(74) *Attorney, Agent, or Firm* — W&K IP

(57) ABSTRACT

The present invention discloses a method for preventing short-term bifurcation and double-spend attack on a block chain network. The method includes the following steps: adding one CA certificate issuance and updating center to the blockchain network; transforming a block data structure and adding a CA certificate-based signature and a public key field; adding certificate effective verification of the signature and the public key to a consensus algorithm of a blockchain network node; improving the consensus algorithm; adding risk identification of a short-term bifurcation malicious double-spending attack to the improved consensus algorithm. The present invention makes minor changes to an original chain and is easy to implement. Because the method only adds the CA center and modifies and adds the necessary consensus algorithms, the method may effectively reduce the possibility of short-term bifurcation double-spending attack. A real-name system CA certificate provides an effective real-name system evidence for subsequently judicial investigation afterwards.

6 Claims, No Drawings

METHOD FOR PREVENTING SHORT-TERM BIFURCATION AND DOUBLE-SPEND ATTACK ON BLOCK CHAIN NETWORK

CROSS-REFERENCE OF RELATED APPLICATIONS

This application is a 371 of International Patent Application No. PCT/CN2019/077932 filed on Mar. 13, 2019 which claims the priority and benefit of Chinese patent application number 201810652782.5, filed Jun. 22, 2018 with China National Intellectual Property Administration, the entire contents of which are incorporated herein by reference.

TECHNICAL FIELD

The present invention relates to the field of the Internet/IT/finance, and specifically to a method for preventing short-term bifurcation and double-spend attack on a block chain network.

BACKGROUND

Block chain technology, also known as distributed ledger technology, is an Internet database technology characterized by decentralization, openness and transparency. Block chain technology was originally the underlying technology of Bitcoin and is currently widely used in finance and other fields. At present, BTG network is subject to short-term bifurcation and double-spend attack, which has caused a large number of digital token losses to securities exchanges, and has once again questioned the security of block chain.

The short-term double-spend attack refers to the following scenarios:

1) An attacker uses his own advantages of computing power (for a POW block chain network)/equity (for a POS block chain network) of controlling a node to bifurcate a target chain (a chain does not broadcast a chain 1 block of a bifurcation chain created by the chain during bifurcation), and ensures that the two chains are in isolation state;

2) A malicious user H initiates a transfer (Transaction T0) of a digital token held by the malicious user to a specific user A (usually a recharge of securities exchanges or a centralized wallet) on a main chain, and H transfers (Transaction T1) the same digital token on the bifurcation chain to another wallet address controlled by H, forming a conflicting transaction;

3) After waiting for X blocks, and after the user A on the main chain completes income confirmation (T0 is confirmed as effective), then the malicious user H withdraws (Transaction T2) from the centralized wallet to a wallet address controlled by the malicious user H on the block chain;

4) Then the malicious user H broadcasts the chain 1 block of the bifurcation chain to the chain network of the main chain. Because the bifurcation chain has the advantages of computing power/the equity, according to the consensus rules of block chain, a chain 1 eventually replaces the chain and realizes that the transaction T1 of the bifurcation chain covers T0 on the main chain, and T2 continues to be confirmed as an effective transaction, enabling theft of a digital token of a user of the main chain.

At present, there is no effective method in the block chain network (a POW consensus network/the POS consensus network) to prevent malicious individuals or organizations (generally mining pools) with a large amount of resources from conducting the short-term bifurcation and double-spend attack. The present invention provides a method for largely preventing the short-term double-spend attack on the block chain network.

SUMMARY

The objective of the present invention is to provide a method for preventing short-term bifurcation and double-spend attack on a block chain network, so as to solve the problems raised in the abovementioned background.

In order to achieve the above objective, the present invention provides the following technical solutions:

A method for preventing short-term bifurcation and double-spend attack on a block chain network includes the following steps:

S1: adding a CA certificate issuing and updating center to a block chain network;

S2: transforming the block data structure and adding signature and public key fields on the basis of the CA certificate;

S3: adding certificate validity verification of signature and public key to a consensus algorithm of block chain network nodes;

S4: improving the consensus algorithm, wherein if there are two consecutive blocks and certificates of block creators are the same, the latter block is discarded as an illegal block; discarding a block whose time difference between one block and a predecessor block of the block is less than half a cycle as an illegal block;

S5: adding short-term bifurcation and malicious double-spend attack risk identification to the improved consensus algorithm;

S6: increasing a height Y of the block prohibited from turning over, wherein if the node regards that a height of a main chain block is Z and a height of a bifurcation point is X, when Z−X>Y, a block of a bifurcation chain is no longer accepted, and a block creator of a bifurcation point is marked as a malicious node; and S7: if the same certificate is marked as the malicious node at a plurality of heights, revoking, by the CA certificate issuing and updating center, a node certificate, broadcasting to each node to complete synchronization of a malicious node certificate, wherein an entire network permanently rejects the block created by the malicious node.

As a further solution of the present invention: in step S1, all nodes that intend to participate in mining must submit certificate issuing application to the CA certificate issuing and updating center, the CA certificate issuing and updating center conducts individual/organization real-name system review; the CA certificate issuing and updating center is also responsible for revoking the CA certificates judged to be malicious node and broadcasting to the entire network.

As a further solution of the present invention: in step S2, a broadcast block includes the signatures of CA public key and CA private key of the block creator.

As a further solution of the present invention, in step S3, if one node receives a block broadcast, the node first checks whether a block certificate is within the validity period, and then checks whether the signature of the block matches the certificate, and excludes a block packaged by an illegal mining node.

As a further solution of the present invention: in step S5, if the following two conditions are met, it is determined that there is the risk of short-term bifurcation malicious double-spend attack:

The block received subsequently is not on a main chain currently identified by the node, but on the bifurcation chain, and the distance of the bifurcation point from a current height exceeds X blocks.

A large-value transaction of the block received subsequently exceeds a threshold and there is a double-spend conflict with the current main chain block, and the large-value transaction is confirmed by the X blocks, or cumulative small transaction conflicts exceed a threshold, the consensus algorithm is a bifurcation chain with the risk of short-term bifurcation attack, and the node temporarily lists the packaged node certificates of two conflicting blocks in a list of possible malicious nodes, and does not accept a broadcast block and a bifurcation received subsequently.

As a further solution of the present invention: in step S7, a CA certificate of a missing malicious node is revoked in a manner of a user loss report after being checked and testified.

Compared with the prior art, the present invention has the following beneficial effects: the method incorporates small modification to an original chain, is easy to implement, and merely adds a CA center and modifies and adds necessary consensus algorithms, which may effectively reduce the possibility of short-term bifurcation and double-spend attack, and provides effective real-name system evidence for judicial investigation by means of a real-name CA certificate after an incident.

DESCRIPTION OF EMBODIMENTS

The technical solutions in embodiments of the present invention will be described clearly below. Obviously, the described embodiments are only a part of embodiments of the present invention, rather than all embodiments. Based on the embodiments of the present invention, all other embodiments obtained by a person of ordinary skill in the art without creative work shall fall within the protection scope of the present invention.

In an embodiment of the present invention, a method for preventing short-term bifurcation and double-spend attack on a block chain network includes the following steps:

A CA certificate issuing and updating center is added to a block chain network. All nodes that intend to participate in mining must submit issuance application of the certificate to the CA certificate issuing and updating center, and the CA certificate issuing and updating center conducts individual/organization real-name system review. The CA certificate issuing and updating center is also responsible for revoking the CA certificate judged to be malicious node and broadcasting the revoke to an entire network;

A block data structure is transformed and signature and public key field on the basis of the CA certificate are added. A broadcasted block includes signatures of CA public key and CA private key of a creator of a block, so that other nodes may verify the identity of the block's creator;

Certificate validity verification of the signature and the public key is added to a consensus algorithm of a node of the block chain network: when one node receives block broadcast, the node first checks whether a block certificate is within the validity period, and then checks whether signature of the block matches the certificate, excludes a block packaged at the node by illegal mining (no certificate, the certificate expired, the certificate revoked).

The consensus algorithm is improved: ① two consecutive blocks have the same certificate of the block's creator, the latter block is discarded as an illegal block. The consensus improvement is to avoid a situation from occurring that the advantages of computing power/equity of one certificate is maliciously exploited for malicious mining so that a large number of blocks are generated in a short time; ② Discarding a block whose time difference between a block and a predecessor block of the block is less than half a cycle as an illegal block. This consensus improvement avoids a situation that the advantages of the computing power/equity of a plurality of certificates are maliciously exploited to rapidly mine and generate a large number of blocks in a short time;

The consensus algorithm is improved. Identification of a risk of short-term bifurcation malicious double-spend attack is added in the consensus algorithm. If the following two conditions are met, it is determined that there is the risk of short-term bifurcation malicious double-spend attack: ① the block received subsequently is not on a main chain currently identified by the node but is on a bifurcation chain, and the distance of a bifurcation point from a current height exceeds X blocks; ② the block received subsequently has a large-value transaction exceeding a threshold (for example, 10,000 Token) and has a double-spend conflict with the current chain block, and the large-value transaction is confirmed by enough blocks (it is assumed that the large-value transaction is confirmed by X blocks), or the cumulative small-value transaction conflicts exceed the threshold (for example, 10,000 tokens, similarly, a batch of small-value transactions is confirmed by X blocks) and the consensus algorithm is the bifurcation chain of a risk of short-term bifurcation attack. The node temporarily lists packaged node certificates of two conflicting blocks in the list of possible malicious nodes (marked as malicious nodes), and does not accept a broadcast block and a bifurcation that are received subsequently;

In order to prevent malicious nodes from hiding the attack intentions of the malicious nodes for a long time, the consensus algorithm is improved; a height of the block Y prohibited from turning over is increased. If the node regards that a height of the main chain block is Z and a height of the bifurcation point is X, when Z−X>Y, a block of the bifurcation chain is no longer accepted. A creator of the block of the bifurcation point is marked as malicious node;

If the same certificate is marked as malicious node at a plurality of heights, the CA certificate issuing and updating center revokes the certificate of the node, and broadcasts to each node to complete synchronization of the certificate of malicious node, and an entire network permanently rejects a block created by the malicious node (follow a consensus rule of Article 3);

For those which missed a net (when a plurality of nodes are controlled and a value of transaction conflict is small, there may be fish that miss the net), the CA certificate is revoked in a manner of a user loss report after being checked and testified. The public security agency is allowed to intervene in investigation to implement remedy.

This method of preventing the short-term double-spend attack on the block chain network incorporates small modification to an original chain, is easy to implement, and merely adds a CA center and modifies and adds necessary consensus algorithms, which may effectively reduce the possibility of short-term bifurcation and double-spend attack, and provides effective real-name system evidence for judicial investigation by means of a real-name CA certificate after an incident.

The foregoing are only preferred embodiments of the present invention. It should be pointed out that for a person of ordinary skill in the art, without departing from the concept of the present invention, a plurality of modifications and improvements may be made and should also be regarded as falling within the scope of protection of the present invention. These will not affect the effect of the implementation of the present invention and the practicability of the patent.

We claim:

1. A method for preventing short-term bifurcation and double-spend attack on a block chain network, comprising the following steps:
   S1: adding a Certificate Authority (CA) certificate issuing and updating center to a block chain network, wherein each node of plurality of nodes that intend to participate in mining must submit certificate issuing application to the CA certificate issuing and updating center, the CA certificate issuing and updating center conducts individual/organization real-name system review; the CA certificate issuing and updating center is also responsible for revoking CA certificates judged to be from a malicious node and broadcasting revocation information to the entire network;
   S2: transforming block data structure and adding signature and public key fields on the basis of the CA certificate;
   S3: adding certificate validity verification of signature and public key to a consensus algorithm of block chain network nodes;
   S4: improving the consensus algorithm, wherein in response to determination that there are two consecutive blocks and certificates of block creators are the same, the latter block is discarded as an illegal block; discarding a block whose time difference between one block and a predecessor block of the block is less than half a cycle as an illegal block;
   S5: adding short-term bifurcation and malicious double-spend attack risk identification conditions to the improved consensus algorithm;
   S6: increasing a height Y of the block is prohibited from being appended to the block chain, wherein in response to determination that a node regards that a height of a main chain block is Z and a height of a bifurcation point is X, such that upon determination that Z−X>Y, a block of a bifurcation chain is no longer accepted, and a block creator of a bifurcation point is marked as malicious node; and
   S7: in response to determination that the same certificate is marked as the malicious node at a plurality of heights, revoking, by the CA certificate issuing and updating center, a node certificate, broadcasting to each node of the plurality of nodes to complete synchronization of a malicious node certificate, wherein an entire network permanently rejects the block created by the malicious node.

2. The method for preventing the short-term bifurcation and double-spend attack on the block chain network according to claim 1, wherein in step S2, a broadcasted block comprises signatures of CA public key and CA private key of the block creator.

3. The method for preventing short-term bifurcation and double-spend attacks on a block chain network according to claim 1, wherein in step S3, if one node receives a block broadcast, the node first checks whether a block certificate is within the validity period, and then checks whether the signature of the block matches the certificate, and excludes a block packaged by an illegal mining node.

4. The method for preventing the short-term bifurcation and double-spend attack on the block chain network according to claim 1, wherein in step S5, in response to satisfying the following two conditions, it is determined that there is the risk of short-term bifurcation malicious double-spend attack: (1) the block received subsequently is not on a main chain currently identified by the node, but on the bifurcation chain, and the distance of the bifurcation point from a current height exceeds X blocks; (2) a large-value transaction of the block received subsequently exceeds a threshold and there is a double-spend conflict with the current main chain block, and the large-value transaction is confirmed by the X blocks, or cumulative small transaction conflicts exceed the threshold, the consensus algorithm is a bifurcation chain with the risk of short-term bifurcation attack, and the node temporarily lists packaged node certificates of two conflicting blocks in a list of possible malicious nodes, and does not accept a broadcast block and a bifurcation received subsequently.

5. The method for preventing short-term bifurcation and double-spend attack on the block chain network according to claim 1, wherein in step S7, a CA certificate of a missing malicious node is revoked in a manner of a user loss report after being checked and testified.

6. The method for preventing short-term bifurcation and double-spend attack on the block chain network according to claim 4, wherein in step S7, a CA certificate of a missing malicious node is revoked in a manner of a user loss report after being checked and testified.

* * * * *